US012773893B2

(12) United States Patent
Lundy et al.

(10) Patent No.: US 12,773,893 B2
(45) Date of Patent: Oct. 27, 2026

(54) DIMMABLE GLASS VISOR FOR AUTOMOTIVE

(71) Applicant: Gentex Corporation, Zeeland, MI (US)

(72) Inventors: Eric S. Lundy, Holland, MI (US); Danny L. Minikey, Jr., Fenwick, MI (US); Aaron Koerth, Hudsonville, MI (US)

(73) Assignee: GENTEX CORPORATION, Zeeland, MI (US)

( * ) Notice: Subject to any disclaimer, the term of this patent is extended or adjusted under 35 U.S.C. 154(b) by 160 days.

(21) Appl. No.: 18/956,714

(22) Filed: Nov. 22, 2024

(65) Prior Publication Data

US 2025/0162387 A1 May 22, 2025

Related U.S. Application Data

(60) Provisional application No. 63/602,165, filed on Nov. 22, 2023.

(51) Int. Cl.

| | |
|---|---|
| ***B60J 3/00*** | (2006.01) |
| ***B60J 3/02*** | (2006.01) |
| ***B60J 3/04*** | (2006.01) |
| ***G02F 1/1333*** | (2006.01) |
| ***G02F 1/153*** | (2006.01) |
| ***G02F 1/163*** | (2006.01) |

(52) U.S. Cl.

CPC ................ *B60J 3/04* (2013.01); *B60J 3/023* (2013.01); *G02F 1/133308* (2013.01); *G02F 1/153* (2013.01); *G02F 1/163* (2013.01)

(58) Field of Classification Search

CPC .................................. B60J 3/04; B60J 3/023

USPC ........................................................ 296/97.2

See application file for complete search history.

(56) References Cited

U.S. PATENT DOCUMENTS 5,011,211 A * 4/1991 Svensson .............. B60Q 3/252 296/97.1

11,312,211 B2 * 4/2022 Huff ......................... B60J 3/026

(Continued)

FOREIGN PATENT DOCUMENTS

CN 105922849 A * 9/2016 .......... B60R 11/0211

CN 215971056 U 3/2022

(Continued)

*Primary Examiner* — Steven O Douglas

(74) *Attorney, Agent, or Firm* — Price Heneveld LLP; Brian James Brewer

(57) ABSTRACT

An automotive visor includes an electrochromic element defining a planar width and height and a mounting structure coupled with the electrochromic element along a first side of a perimeter thereof and configured for rotatably mounting the automotive visor within a vehicle interior. The mounting structure includes a first frame member defining a first interior face and a first channel portion and a second frame member defining a second interior face and a second channel portion. The first frame member and the second frame member are coupled together with the first and second faces in mutual contact and the first and second channel portions defining a channel receiving the first side of the perimeter therein. Each of the first and second frame members further define respective spacer projections that extend inwardly into the channel and contact opposing first and second faces of the electrochromic element, respectively.

20 Claims, 5 Drawing Sheets

(56) References Cited

U.S. PATENT DOCUMENTS

2019/0263230 A1 8/2019 Kishimoto
2019/0389282 A1 * 12/2019 Wang ..................... B60J 3/0239

FOREIGN PATENT DOCUMENTS

JP 2006142915 A 6/2006
JP 2009029245 A 2/2009

* cited by examiner

DIMMABLE GLASS VISOR FOR AUTOMOTIVE

CROSS-REFERENCE TO RELATED APPLICATION

This application claims priority to and the benefit under 35 U.S.C. § 119(e) of U.S. Provisional Application No. 63/602,165, filed on Nov. 22, 2023, entitled "DIMMABLE GLASS VISOR FOR AUTOMOTIVE," the disclosure of which is hereby incorporated herein by reference in its entirety.

BACKGROUND

The present disclosure relates generally to an automotive visor and more particularly, relates to an automotive visor with an electrochromic element and an associated mounting structure.

Automotive visors have been developed that include an open section in which an electrochromic element is mounted, thereby providing an area thereof that exhibits a controlled level of light transmissiveness. This allows the user to see through a portion of the visor, either fully or with various levels of dimming, which can provide for active adjustment of a deployed visor, depending the conditions and need, without requiring the user to repeatedly stow and deploy the visor. The ability to have a partially-transparent section of the visor can also allow the user to see through that portion of the visor, while the visor still provides some shading from sun, glare, or other such visibility conditions. Requirements of secure mounting of the electrochromic element, as well as protection thereof from damage, have limited the total area of such visors that can be occupied by the electrochromic element, limiting their overall usefulness.

SUMMARY

According to one aspect of the present invention, an automotive visor includes an electrochromic element defining a planar width and height and a mounting structure coupled with the electrochromic element along a first side of a perimeter thereof and configured for rotatably mounting the automotive visor within a vehicle interior. The mounting structure includes a first frame member defining a first interior face and a first channel portion and a second frame member defining a second interior face and a second channel portion. The first frame member and the second frame member are coupled together with the first and second faces in mutual contact and the first and second channel portions defining a channel receiving the first side of the perimeter therein. Each of the first and second frame members further define respective spacer projections that extend inwardly into the channel and contact opposing first and second faces of the electrochromic element, respectively. The automotive visor further includes an adhesive layer disposed within the channel and filling at least portions defined between adjacent ones of the spacer projections and the respective first and second faces of the electrochromic element.

These and other features, advantages, and objects of the present device will be further understood and appreciated by those skilled in the art upon studying the following specification, claims, and appended drawings.

BRIEF DESCRIPTION OF THE DRAWINGS

The present invention will become more fully understood from the detailed description and the accompanying drawings, wherein.

DETAILED DESCRIPTION OF EMBODIMENTS

Figure 1:
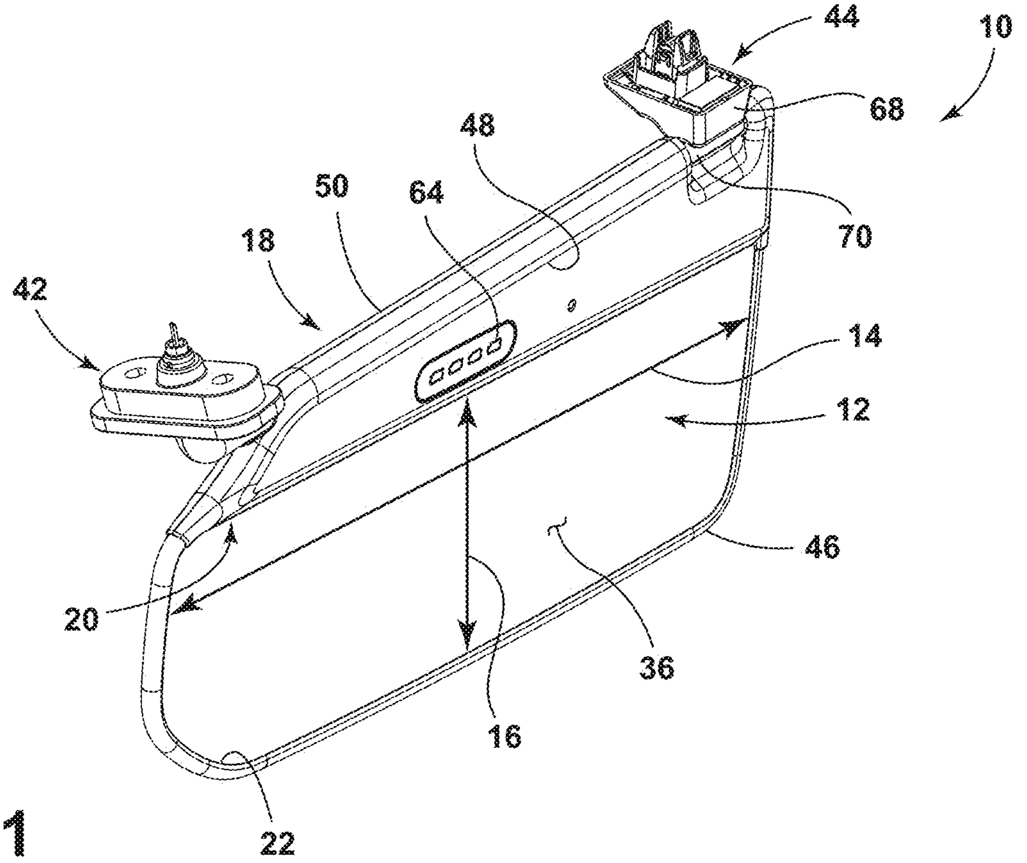
FIG. 1 is a rear perspective view of an automotive visor according to an aspect of the disclosure.

The present illustrated embodiments reside primarily in combinations of method steps and apparatus components related to an automotive visor. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein the terms "upper," "lower," "right," "left," "rear," "front," "vertical," "horizontal," and derivatives thereof shall relate to the device as oriented in FIG. 1. However, it is to be understood that the device may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Ordinal modifiers (i.e., "first", "second", etc.) may be used to distinguish between various structures of the disclosed transportation rack in various contexts, but that such ordinals are not necessarily intended to apply to such elements outside of the particular context in which they are used and that, in various aspects different ones of the same class of elements may be identified with the same, context-specific ordinal. In such instances, other particular designations of the elements are used to clarify the overall relationship between such elements. Ordinals are not used to designate a position of the elements, nor do they exclude additional, or intervening, non-ordered elements or signify an importance or rank of the elements within a particular class.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises a . . . " does not, without more constraints, preclude the existence of additional identical elements in the process, method, article, or apparatus that comprises the element.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the terms "about", "approximately", or "substantially" are intended to mean that a value of a parameter is close to a stated value or position. However, minor differences may prevent the values or positions from being exactly as stated. Thus, unless otherwise noted, differences of up to ten percent (10%) for a given value are reasonable differences from the ideal goal of exactly as described. In many instances, a significant difference can be when the difference is greater than ten percent (10%), except as where would be generally understood otherwise by a person of ordinary skill in the art based on the context in which such term is used.

Referring to FIGS. 1-8, reference numeral 10 generally designates an automotive visor. The automotive visor 10 includes an electrochromic element 12 defining a planar width 14 and height 16 and a mounting structure 18 coupled with the electrochromic element 12 along a first side 20 of a perimeter 22 thereof and configured for rotatably mounting the automotive visor 10 within a vehicle interior. The mounting structure 18 includes a first frame member 24 defining a first interior face 26 and a first channel portion 28*a* and a second frame member 30 defining a second interior face 32 and a second channel portion 28*b*. The first frame member 24 and the second frame member 30 are coupled together with the first and second faces 26, 32 in mutual contact and the first and second channel portions 28*a*, 28*b* defining a channel 28 receiving the first side 20 of the perimeter 22 therein. Each of the first and second frame members 24, 30 further defining respective spacer projections 34 (FIGS. 6-8) that extend inwardly into the channel 28 and contact opposing first and second faces 36, 38 of the electrochromic element 12, respectively. The automotive visor 10 further includes an adhesive layer 40 (FIG. 6) disposed within the channel 28 and filling at least portions defined between adjacent ones of the spacer projections 34 and the respective first and second faces 36, 38 of the electrochromic element 12.

Figure 2:
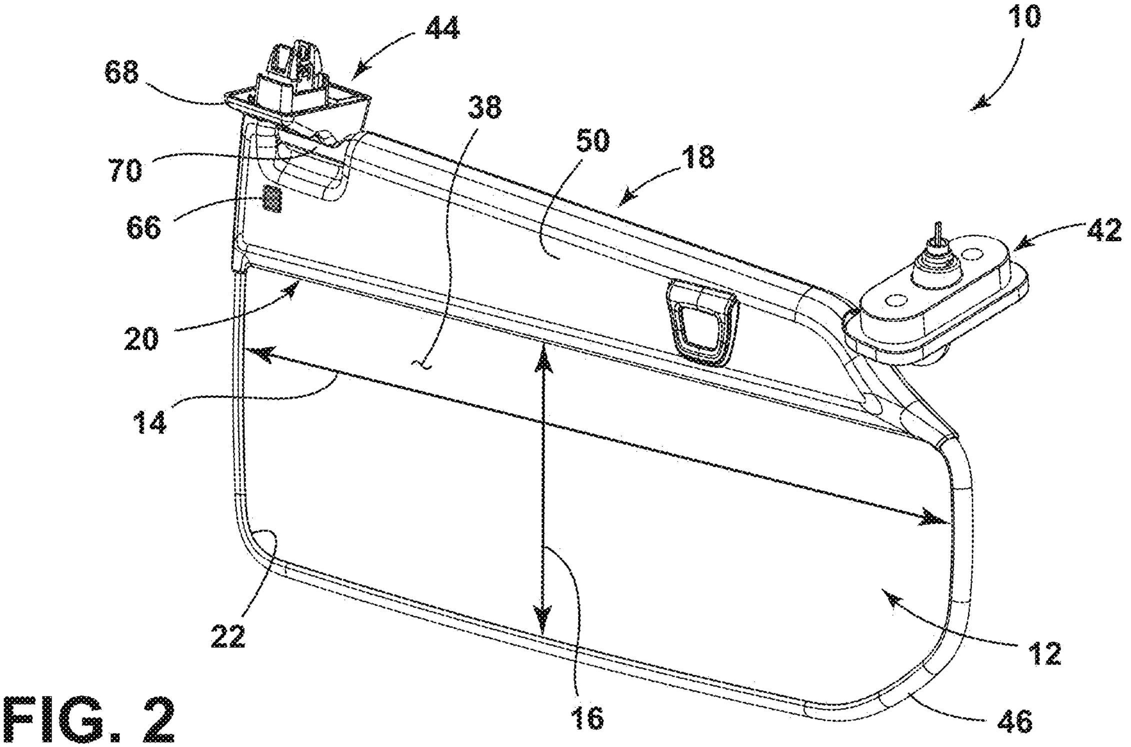
FIG. 2 is a front perspective view of the automotive visor of FIG. 1.

Referring to FIGS. 1 and 2, the mounting structure 18 includes a first mount 42 and a second mount 44 (discussed in further detail below) generally disposed on opposite lateral sides of the automotive visor 10 and configured to allow the visor 10 to rotate from a stowed position, wherein the visor 10 is disposed against a headliner of the vehicle, and a range of use positions, wherein the visor 10 is rotated downwardly from the headliner to at least partially extend into the user's field of vision with respect to the adjacent vehicle windshield to, for example, shade the user's eyes from direct sunlight visible through the upper portion of the windshield, as is typical of standard automotive visors. Additionally, in an example, the first mount 42 can be configured to allow the visor 10 to rotate laterally outward so as to extend along a side window of the vehicle for similar purposes, with the second mount 44 being releasable to facilitate such movement. As can be appreciated the automotive visor 10 depicted herein is configured for use on a driver side of the vehicle, with a passenger-side visor being generally configured as a mirror image of the depicted automotive visor 10.

As discussed above, the present automotive visor 10 includes an electrochromic element 12 coupled with and, accordingly, retained by the mounting structure 18. In this manner, the electrochromic element 12 rotates with the rotation of the automotive visor 10, overall, as discussed above. As such, the above-mentioned width 14 and height 16 of the electrochromic element 12 are defined with respect to the orientation shown in FIGS. 1 and 2 of the drawings and are understood as being fixed relative to the electrochromic element 12 such that the dimensions remain fixed with rotation of the visor 10 and, accordingly, the electrochromic element 12. The particular structure of the electrochromic element 12 is discussed in further detail below, but it is to be generally appreciated that the electrochromic element 12 is configured so as to exhibit a controllable level of light transmission therethrough. In various examples, the transmission can be from near full transmission (e.g., about 95% or more) to zero light transmission (i.e., fully opaque), depending on the application of an electrical current or potential thereto. In this manner, the incorporation of the electrochromic element 12 allows for the portion of the automotive visor 10 that comprises the electrochromic element 12 to impart a level of selective transmissiveness to the visor 10 such that direct light, for example, can be reduced to a comfortable level without obstructing the view through the portion of the windshield that the electrochromic element 12 overlies (so long as some level of transmission remains within the electrochromic element 12). Accordingly, the greater the portion of the visor 10 occupied by the electrochromic element 12, the greater the area of possible visibility within the visor 10. The above-described use of the mounting structure 18, particularly the first frame member 24 and the second frame member 30 to retain the electrochromic element 12 can allow for a relative increase in the area of the automotive visor 10 occupied by the electrochromic element 12.

As further shown in FIGS. 1-4, the automotive visor 10 can further include a trim piece 46 extending along the perimeter 22 of the electrochromic element 12 that is positioned outside or otherwise extends outwardly out of the channel 28 and, accordingly, the mounting structure 18. The trim piece 46 can be an edge bead of thermoplastic elastomer ("TPE"), thermoplastic urethane ("TPU"), or the like, and can be extruded into a form that generally defines a rounded outer profile and an inner profile suited for receiving the perimeter 22 of the electrochromic element 12 therein. The trim piece 46 can be retained to the perimeter 22 of the electrochromic element 12 by way of an adhesive, or the like, and can be configured to cover an exterior sealing area defined generally around the perimeter 22. As shown, the trim piece 46 extends along second, third, and forth, sides of the electrochromic element 12, with the first side 20 being received within the channel 28 such that the corresponding portion of the sealing area is covered by the channel 28. The trim piece 46 can, accordingly, protect the portion of the seal of the electrochromic element 12 outside of the mounting structure 18 from damage and can provide a portion of the automotive visor 10 that can be conveniently grasped or pressed on by the user to reposition the visor 10, as needed. In this manner, it is to be appreciated that the trim piece 46 may not be directly connected with the mounting structure 18 and may, additionally, not be used to provide structural support or retention of the electrochromic element 12. In an example, the trim piece 46 can extend inward from the perimeter 22 of the electrochromic element 12 by, at most, 3 mm.

Figure 3:
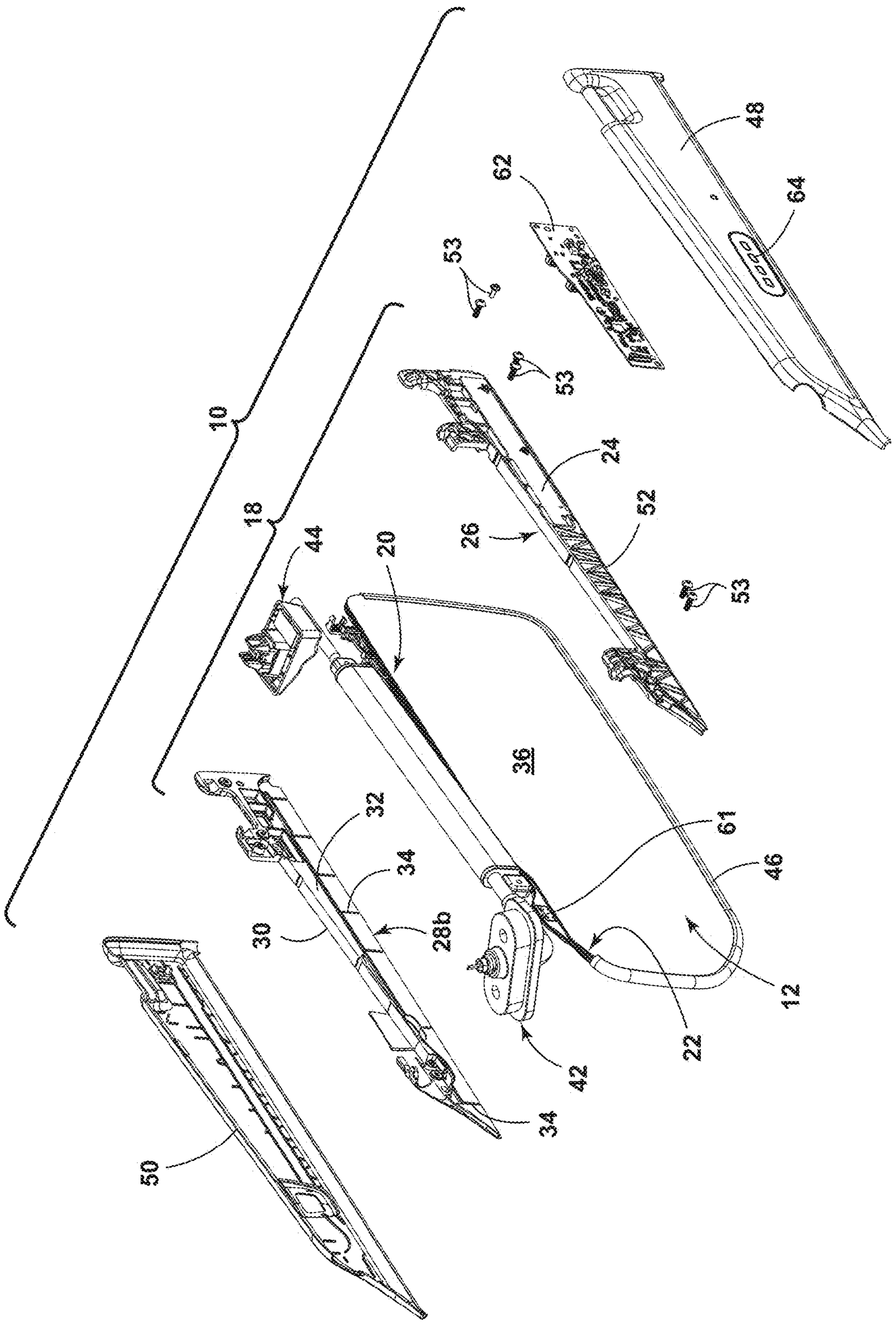
FIG. 3 is a rear perspective exploded view of the automotive visor.
Figure 4:
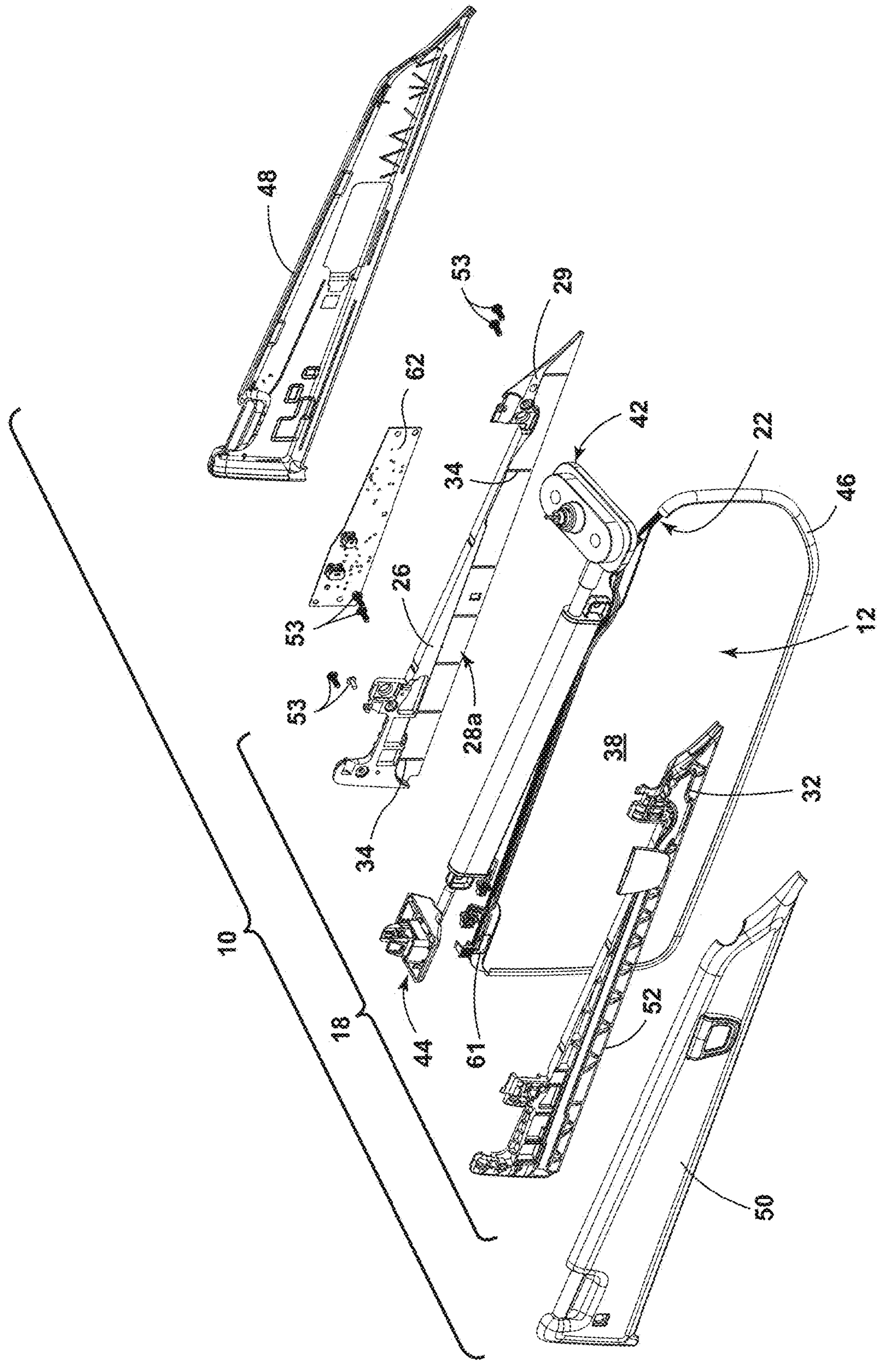
FIG. 4 is a front perspective exploded view of the automotive visor.

As further shown in FIGS. 3 and 4, the above-described first frame member 24 and second frame member 30 can be internal components of the automotive visor 10 such that they are enclosed within first and second cover members 48 and 50 that can extend over the first and second frame members 24 and 30 to provide a desired cosmetic appearance, including a more unitary appearance with the trim piece 46. The cover members 48 can be laser-welded together so as to not require additional mechanical connection therebetween.

Figure 5:
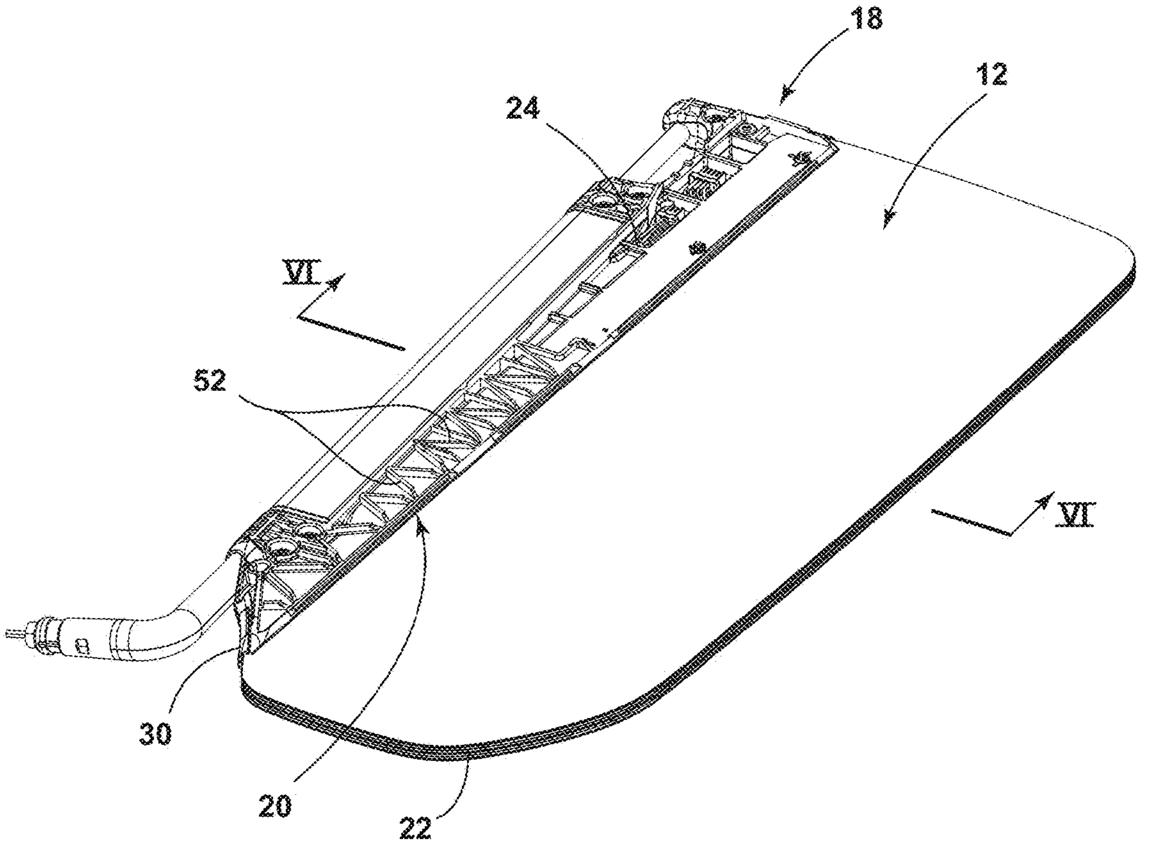
FIG. 5 is a perspective view of an electrochromic element coupled with a mounting structure of the automotive visor.
Figure 7:
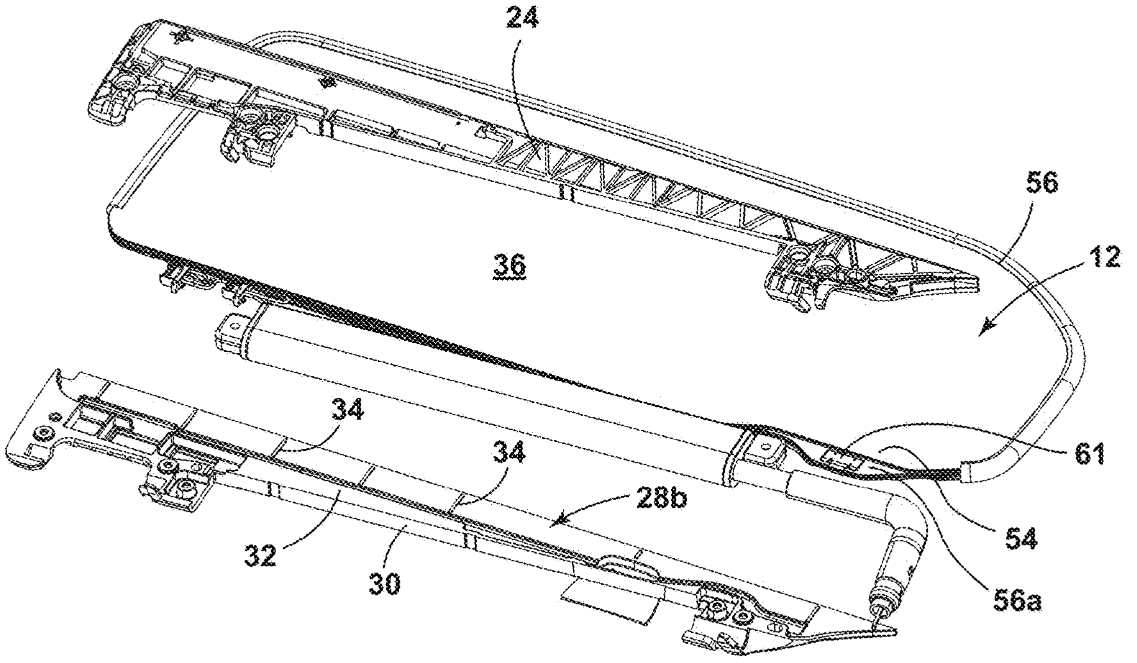
FIG. 7 is a perspective assembly view of the electrochromic element and mounting structure.
Figure 8:
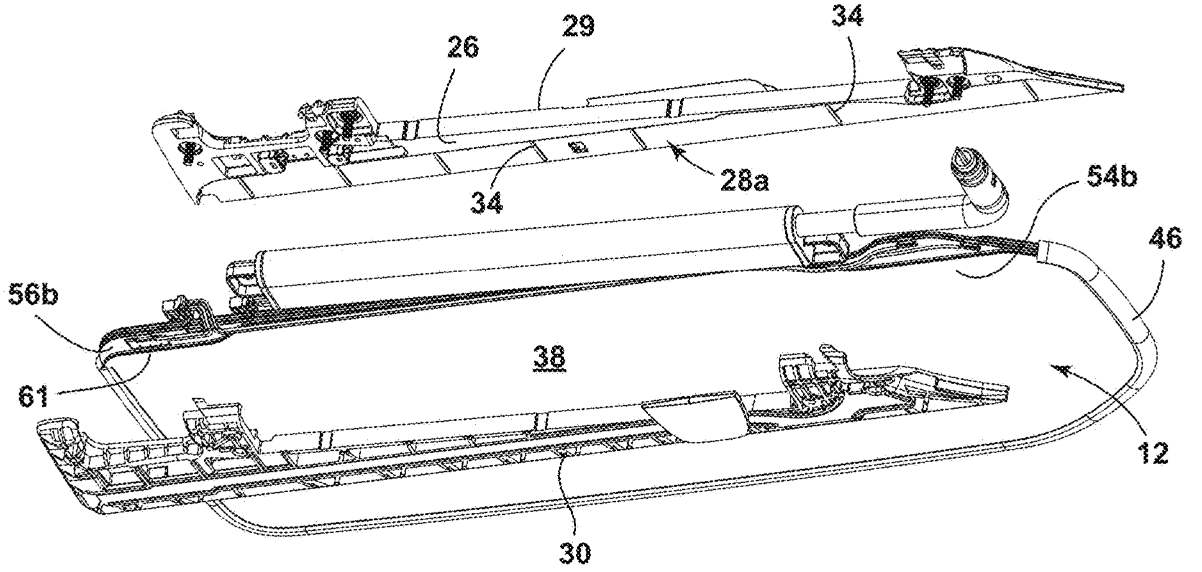
FIG. 8 is an alternative perspective assembly view of the electrochromic element and mounting structure.

With additional reference to FIG. 5, the first frame member 24 and second frame member 30 can include a plurality of structural ribs 52 to provide rigidity to the frame members 24 such that generally even contact is made between the various points of contact between the first frame member 24 and second frame member 30 with the electrochromic element 12. This rigidity can improve such contact when the first frame member 24 and second frame member 30 are coupled together using mechanical fasteners, such as screws 53, that are positioned in varying, spaced apart locations along the mounting structure 18, as shown. As discussed above, at least some of such points of contact can be made by the spacer projections 34. In one embodiment, all points of direct contact can be made by the spacer projections 34. As shown in FIG. 7-9, the spacer projections 34 can be configured to provide a partial retention force between the respective first frame member 24 and second frame member 30 with a generally even distribution of such forces (e.g., +/−10%) across such spacer projections 34 and the corresponding first face 36 and second face 38 of the electrochromic element 12. In this manner, the spacer projections 34 may be present between the first frame member 24 and second frame member 30 in respective, aligned pairs. Additionally, the spacer projections 34 may serve to maintain a generally even spacing (e.g., +/−5% or 0.01 mm) between the first face 36 and second face 38 and the portions of the respective interior walls 54 of the channel portions 28*a* and 28*b*. This even spacing contributes to generally even application of adhesive to form the adhesive layer 40 within the channel in the portions of the channel 28 between the spacer projections 34. This even formation of the adhesive layer 40 can facilitate robust retention of the electrochromic element 12 within the mounting structure 18, including without the incorporation of a structural frame. Additionally, this structure can help minimize the overlap of the mounting structure 18 with the electrochromic element 12 along the first side 20. In one aspect, such overlap can be less than 20 mm, and in one example, about 17 mm. This reduced structural overlap, along with the reduced cosmetic overlap of the trim member 24 can result in a large electrochromic area relative to the overall area of the automotive visor 10, which results in a large area that provides shaded visibility to the user.

Figure 6:
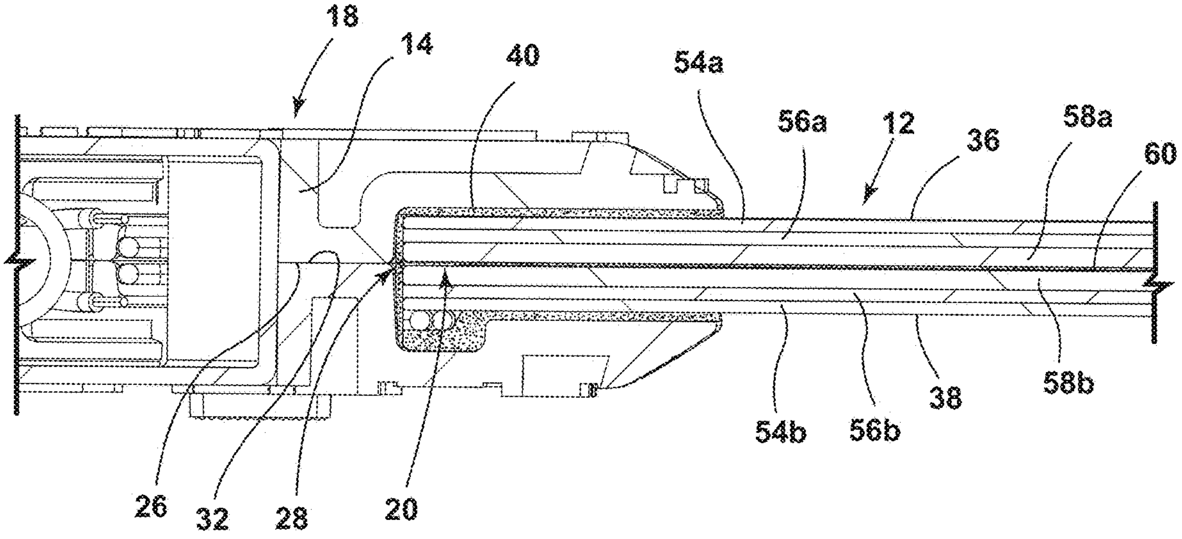
FIG. 6 is a cross-section view of the electrochromic element coupled with a mounting structure of the automotive visor taken along line VI-VI in FIG. 5.

Continuing with respect to FIG. 6, the electrochromic element 12 can include a plurality of layers. In the illustrated example, the electrochromic element 12 includes opposing outer layers 54*a* and 54*b* that define the first face 36 and second face 38 of the electrochromic element 12, respectively. Outer layers 54*a* and 54*b* can be, generally, of glass and, in a specific example, of soda lime glass at a thickness of about 0.7 mm. Respective intermediate layers 56*a* and 56*b* of, for example, Polyvinylpyrrolidone ("PVP") can positioned inward of the outer layers 54*a* and 54*b*. A first electrochromic substrate 58*a* and second electrochromic substrate 58*b* can be positioned inward of the intermediate layers 56*a*, 56*b*, respectively, and can enclose an electrochromic medium 60 therebetween with a seal enclosing the electrochromic medium 60 and extending around the perimeter 22 between the outer layers 54*a* and 54*b*.

In various aspects of the electrochromic element 12 disclosed herein, at least one of the first electrochromic substrate 58*a* and the second electrochromic substrate 58*b* can be substantially transparent. The term "substantially transparent" as used herein will be understood by persons of ordinary skill in the art and will vary to some extent depending upon the context in which it is used. If there are uses of the term which are not clear to persons of ordinary skill in the art, given the context in which it is used, the term means that the material allows a light transmission of about 75% or more of a beam of light having a wavelength of 400 nm directed to the material at a specular angle of 10° through a thickness of 2 mm of the material. In various applications, one or both of the first electrochromic substrate 58*a* and the second electrochromic substrate 58*b* can include respective conductive material coatings on the interiors thereof (i.e., in contact with the electrochromic medium 60) to facilitate application of the above-described electric potential to the electrochromic medium 60. In connection with the substantially transparent configurations of the first and second electrochromic substrates 58*a* and 58*b* described herein, the conductive coatings can include transparent conductive oxide (TCO) coatings. For example, the conductive material may be a TCO such as indium tin oxide (ITO), indium zinc oxide (IZO), zinc oxide, and tin oxide. As shown in FIGS. 7 and 8, portions of the first electrochromic substrate 58*a* and the second electrochromic substrate 58*b* can extend outwardly from the intermediate layers 56*a*, 56*b* and the outer layers 54*a*, 54*b* in an area within the mounting structure 18 such that terminals 61 respectively associated with the first electrochromic substrate 58*a* and the second electrochromic substrate 58*b* are exposed for electrical connection therewith for application of the above-described potential.

The electrochromic medium can be of various compositions generally known in the art that vary in transparency from mostly transparent to mostly opaque with the application of an electrical potential thereto. In this manner, it is understood that when a sufficient potential is applied to the electrochromic element 12, the electrochromic medium 60 undergoes a change in the level of light transmission therethrough. The change in light transmission may be the result of a color change in the medium 60 such that oxidation and reduction of the anodic and cathodic species therein changes the absorption of the medium 60, resulting in a reduction in transmission upon application of the potential. Release of the potential may result in maintenance of the reduced transmission state when the anodic and cathodic materials are confined with respect to movement through the space defined between the first and second electrochromic substrates 58*a*, 58*b*, or release of the potential may result in an increase in transmission if the anodic and cathodic materials are allowed to migrate through the chamber in which the electrochromic medium 60 is retained or if the reduced cathodic and oxidized anodic are not held separated in the chamber 32. Shorting of the electrochromic element 12 after application of a potential may speed the time necessary for the transmission state to return to the original, pre-potential light transmission. Momentarily reversing the applied potential may also speed the change in transmission from low light transmission to high light transmission.

As can be appreciated, the electrochromic medium 60 can take a number of different forms such as thermoplastic polymeric films, solution phase, or gelled phase. Illustrative electrochromic media are those as described in U.S. Pat. Nos. 4,902,108; 5,888,431; 5,940,201; 6,057,956; 6,268,950; 6,635,194; 8,928,966; 10,539,853; and U.S. Patent Application Publication No. 2002/0015214, the entire contents of which are hereby incorporated by reference herein. The anodic and cathodic electrochromic materials within the electrochromic medium 60 can also include coupled materials as described in U.S. Pat. No. 6,249,369. The concentration of the electrochromic materials can be selected as taught in U.S. Pat. No. 6,137,620. Additionally, a single-layer, single-phase medium may include a medium where the anodic and cathodic materials are incorporated into a polymer matrix as is described in International Patent Application Serial Nos. PCT/EP98/03862 and PCT/US98/05570.

The electrochromic medium may be multilayer or multiphase. In multilayered, the medium may be made up in layers and includes an electroactive material attached directly to an electrically conducting electrode or confined in close proximity thereto which remains attached or confined when electrochemically oxidized or reduced. In multiphase, one or more materials in the medium undergoes a change in phase during the operation of the device, for example a material contained in solution in the ionically conducting electrolyte forms a separate layer on the electrically conducting electrode when electrochemically oxidized or reduced.

The electrochromic medium 60 may include materials such as, but not limited to, anodics, cathodics, light absorbers, light stabilizers, thermal stabilizers, antioxidants, thickeners, viscosity modifiers, tint providing agents, redox buffers, and mixtures thereof. According to some embodiments, the anodic materials may include, but are not limited to, ferrocenes, ferrocenyl salts, phenazines, phenothiazines, and thianthrenes. The anodic materials may also include those incorporated into a polymer film such as polyaniline, polythiophenes, polymeric metallocenes, or a solid transition metal oxide, including, but not limited to, oxides of vanadium, nickel, iridium, as well as numerous heterocyclic compounds. Other anodic materials may include those as described in in U.S. Pat. Nos. 4,902,108; 6,188,505; and 6,710,906. In any of the above aspects, the anodic material may be a phenazine, a phenothiazine, a triphenodithiazine, a carbazole, an indolocarbazole, a biscarbazole, or a ferrocene confined within the second polymer matrix, the second polymer matrix configured to prevent or minimize substantial diffusion of the anodic material in the activated state.

Cathodic materials may include, for example, viologens, such as methyl viologen, octyl viologen, or benzyl viologen; ferrocinium salts, such as (6-(tri-tert butylferrocenium) hexyl) triethylammonium. While specific cathodic materials have been provided for illustrative purposes only, numerous other conventional cathodic materials are likewise contemplated for use including, but by no means limited to, those disclosed in previously referenced and incorporated U.S. Pat. Nos. 4,902,108; 6,188,505; and 6,710,906. Moreover, it is contemplated that the cathodic material may include a polymer film, such as various polythiophenes, polymeric viologens, an inorganic film, or a solid transition metal oxide, including, but not limited to, tungsten oxide. The cathodic material may be a protic soluble electrochromic material (e.g., soluble in a protic solvent such as an alcohol and/or water), or a single component electrochromic material (i.e., the electrochromic material includes a compound that includes both cathodic and anodic moieties in the same molecule or cation/anion combination), such as described in U.S. Provisional Appl. No. 62/257,950, filed on Nov. 20, 2015, and 62/258,051, filed on Nov. 20, 2015. Further examples of anodic and cathodic materials may be found in U.S. Pat. Nos. 4,902,108; 5,294,376; 5,998,617; 6,193,912; and 8,228,590.

For illustrative purposes only, the concentration of the anodic and/or cathodic materials in the electrochromic medium can range from approximately 1 millimolar (mM) to approximately 500 mM and more preferably from approximately 2 mM to approximately 100 mM. While particular concentrations of the anodic as well as cathodic materials have been provided, it will be understood that the desired concentration may vary greatly depending upon the geometric configuration of the chamber containing the electrochromic medium.

For purposes of the present disclosure, a solvent of electrochromic medium may comprise any of a number of common, commercially available solvents including 3-methylsulfolane, dimethyl sulfoxide, dimethyl formamide, tetraglyme and other polyethers; alcohols such as ethoxyethanol; nitriles, such as acetonitrile, glutaronitrile, 3-hydroxypropionitrile, and 2-methylglutaronitrile; ketones including 2-acetylbutyrolactone, and cyclopentanone; cyclic esters including beta-propiolactone, gamma-butyrolactone, and gamma-valerolactone; organic carbonates including propylene carbonate (PC), ethylene carbonate and methyl ethyl carbonate; and mixtures of any two or more thereof.

The electrochromic medium may include a thermoplastic polymer in which the electrochromic materials are confined (an "electrochromic thermoplastic"). Such media are described in U.S. Provisional Application No. 62/184,704, filed on May 25, 2015.

Returning to FIGS. 3 and 4, the automotive visor 10 can further include electronic circuitry, including circuitry carried on a printed circuit board ("PCB") 62 for controlling a transmission level of the electrochromic element 12. In one aspect, a user input 64, shown in FIG. 1, can be positioned on an exterior side of the automotive visor 10 on a side facing the user when the automotive visor 10 is in a deployed position. The user input 64 can include buttons or the like for allowing a user to set a transmission level for the electrochromic element 12, for example, at various preset levels or the like. The automotive visor 10 can also include an ambient light sensor 66 that can communicate a signal for use by the electronic circuitry to further adjust the transmission level of the electrochromic element 12 responsive to the detected level of light incident on the outside of the automotive visor 10 (e.g., causing additional dimming in response to increased ambient or incident light). Still further, the automotive visor can further include a position sensor (e.g., as a component of the PCB 62) that can allow the electronic circuitry to determine whether the automotive visor 10 is in a deployed position. This determination can allow the electronic circuitry to deactivate the electrochromic element 12 when the visor 10 is in the stowed position to, for example, reduce power consumption or the like.

As shown in FIGS. 1 and 2, the automotive visor 10 can be configured such that the second mount 44 includes a receptacle 68 that is removably attachable to the mounting structure 18 and configured for at least partially rotatably mounting the automotive visor 10 within the vehicle interior. As shown, the receptacle 68 is a block that can be attached with the headliner and facilitates rotational mounting of the automotive visor 10 by connection with a rod 70, as discussed above. The receptacle 68 is detachable from the mounting structure 18 under a detachment force that is less than a fracture force of the electrochromic element 12. In one aspect, the selection of such a release force can prevent breakage of the electrochromic element 12 by way of an impact thereon. Such detachment can include uncoupling of the receptacle 68 from the rod 70 and can be facilitated by a calibrated, releasable snap fit or by incorporation of a magnet into the receptacle 68 and the use of a magnetic material for the rod 70. In such an arrangement, the position sensor can be a hall-effect sensor that can be used to determine the position of the automotive visor 10 based on the position or orientation of the magnetic field of the receptacle 68 with respect to, for example, the PCB 62.

The invention disclosed herein is further summarized in the following paragraphs and is further characterized by combinations of any and all of the various aspects described therein.

According to another aspect of the present disclosure, an automotive visor includes an electrochromic element defining a planar width and height and a mounting structure coupled with the electrochromic element along a first side of a perimeter thereof and configured for rotatably mounting the automotive visor within a vehicle interior. The mounting structure includes a first frame member defining a first interior face and a first channel portion and a second frame member defining a second interior face and a second channel portion. The first frame member and the second frame member are coupled together with the first and second faces in mutual contact and the first and second channel portions defining a channel receiving the first side of the perimeter therein. Each of the first and second frame members further define respective spacer projections that extend inwardly into the channel and contact opposing first and second faces of the electrochromic element, respectively. The automotive visor further includes an adhesive layer disposed within the channel and filling at least portions defined between adjacent ones of the spacer projections and the respective first and second faces of the electrochromic element.

The automotive visor of ¶ [0040] can further include a trim piece extending along an edge of the electrochromic element positioned outside of the channel, and the trim piece can extend inward from the edge of the electrochromic element by, at most, 3 mm.

The automotive visor of ¶¶ [0040] or [0041] can further include at least one of a user input and an ambient light sensor and electronic circuitry for controlling a transmission level of the electrochromic element responsive to a signal from at the at least one of the user input and the ambient light sensor.

The automotive visor of ¶ [0042] can further include a position sensor, and the electronic circuitry can be further configured for controlling the transmission level of the electrochromic element responsive to an input from the position sensor.

The automotive visor of any of ¶¶ [0040]-[0043] can further include a receptacle removably attachable to the mounting structure and configured for at least partially rotatably mounting the automotive visor within the vehicle interior, the receptacle being detachable from the mounting structure under a detachment force that is less than a fracture force of the electrochromic element.

It will be understood by one having ordinary skill in the art that construction of the described disclosure and other components is not limited to any specific material. Other exemplary embodiments of the disclosure disclosed herein may be formed from a wide variety of materials, unless described otherwise herein.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

The above description is considered that of the preferred embodiments only. Modifications of the invention will occur to those skilled in the art and to those who make or use the invention. Therefore, it is understood that the embodiments shown in the drawings and described above are merely for illustrative purposes and not intended to limit the scope of the invention, which is defined by the claims as interpreted according to the principles of patent law, including the doctrine of equivalents.

What is claimed is:

1. An automotive visor, comprising:

an electrochromic element defining a planar width and height; and a mounting structure coupled with the electrochromic element along a first side of a perimeter thereof and configured for rotatably mounting the automotive visor within a vehicle interior, the mounting structure including a first frame member defining a first interior face and a first channel portion;

a second frame member defining a second interior face and a second channel portion, the first frame member and the second frame member being coupled together with the first and second interior faces in mutual contact and the first and second channel portions defining a channel receiving the first side of the perimeter therein, each of the first and second frame members further defining respective spacer projections that extend inwardly into the channel and contact opposing first and second faces of the electrochromic element, respectively; and an adhesive layer disposed within the channel and filling at least portions defined between adjacent ones of the spacer projections and the respective first and second faces of the electrochromic element.

2. The automotive visor of claim 1, further including a trim piece extending along an edge of the electrochromic element positioned outside of the channel.

3. The automotive visor of claim 2, wherein the trim piece covers the edge of the electrochromic element, at least along a portion outside of the channel, and extends inward from the edge of the electrochromic element along respective planar front and back faces thereof by, at most, 3 mm.

4. The automotive visor of claim 2, wherein the trim piece defines opposite first and second ends that are positioned within respective portions of the mounting structure.

5. The automotive visor of claim 2, wherein the trim piece is an extruded elastomeric member that defines a channel therein that receives the edge of the electrochromic element.

6. The automotive visor of claim 1, further including:

at least one of a user input and an ambient light sensor; and electronic circuitry for controlling a transmission level of the electrochromic element responsive to a signal from at the at least one of the user input and the ambient light sensor.

7. The automotive visor of claim 6, further including a position sensor, wherein:

the electronic circuitry is further configured for controlling the transmission level of the electrochromic element responsive to an input from the position sensor.

8. The automotive visor of claim 1, further including a receptacle removably attachable to the mounting structure and configured for at least partially rotatably mounting the automotive visor within the vehicle interior, wherein the receptacle is detachable from the mounting structure under a detachment force that is less than a fracture force of the electrochromic element.

9. The automotive visor of claim 1, further including first and second cover members that collectively enclose the mounting structure.

10. An automotive visor, comprising:

an electrochromic element defining a planar width and height; and a mounting structure coupled with the electrochromic element along a first side of a perimeter thereof and configured for rotatably mounting the automotive visor within a vehicle interior, the mounting structure including a first frame member defining a first interior face and a first channel portion;

a second frame member defining a second interior face and a second channel portion, the first frame member and the second frame member being coupled together with the first and second interior faces in mutual contact and the first and second channel portions defining a channel receiving the first side of the perimeter therein, respectively; and an adhesive layer disposed within the channel and securing the electrochromic element within the channel; and a trim piece extending along remaining sides of the electrochromic element positioned outside of the channel.

11. The automotive visor of claim 10, wherein each of the first and second frame members further defines respective spacer projections that extend inwardly into the channel and contact opposing first and second faces of the electrochromic element.

12. The automotive visor of claim 11, wherein the adhesive layer further fills at least portions defined between adjacent ones of the spacer projections and the respective first and second faces of the electrochromic element.

13. The automotive visor of claim 10, wherein the trim piece covers an edge of the electrochromic element along the remaining sides thereof and extends inward from the edge of the electrochromic element along respective planar front and back faces thereof by, at most, 3 mm.

14. The automotive visor of claim 10, wherein the trim piece defines opposite first and second ends that are positioned within respective portions of the mounting structure.

15. The automotive visor of claim 10, wherein the trim piece is an extruded elastomeric member that defines a channel therein that receives the edge of the electrochromic element.

16. The automotive visor of claim 10, further including first and second cover members that collectively enclose the mounting structure, wherein:

the first and second cover members further enclose first and second interfaces between the cover member and the trim piece on opposite ends of the mounting structure.

17. An automotive visor, comprising:

an electrochromic element defining a planar width and height; and a mounting structure coupled with the electrochromic element along a first side of a perimeter thereof and configured for rotatably mounting the automotive visor within a vehicle interior, the mounting structure including a first frame member defining a first interior face and a first channel portion;

a second frame member defining a second interior face and a second channel portion, the first frame member and the second frame member being coupled together with the first and second interior faces in mutual contact and the first and second channel portions defining a channel receiving the first side of the perimeter therein, each of the first and second frame members further defining respective spacer projections that extend inwardly into the channel and contact opposing first and second faces of the electrochromic element, respectively; and an adhesive layer disposed within the channel and filling at least portions defined between adjacent ones of the spacer projections and the respective first and second faces of the electrochromic element; and a trim piece extending along remaining sides of the electrochromic element positioned outside of the channel.

18. The automotive visor of claim 17, further including:

at least one of a user input and an ambient light sensor; and electronic circuitry for controlling a transmission level of the electrochromic element responsive to a signal from at the at least one of the user input and the ambient light sensor.

19. The automotive visor of claim 18, further including a position sensor, wherein:

the electronic circuitry is further configured for controlling the transmission level of the electrochromic element responsive to an input from the position sensor.

20. The automotive visor of claim 19, further including a receptacle removably attachable to the mounting structure and configured for at least partially rotatably mounting the automotive visor within the vehicle interior, wherein the receptacle is detachable from the mounting structure under a detachment force that is less than a fracture force of the electrochromic element.

* * * * *